US011503130B2

(12) United States Patent
Hall et al.

(10) Patent No.: US 11,503,130 B2
(45) Date of Patent: Nov. 15, 2022

(54) METHODS AND APPARATUSES FOR EXPANDING TARGETS OF CREATIVES BASED ON SIGNATURES

(71) Applicant: AT&T Intellectual Property I, L.P., Atlanta, GA (US)

(72) Inventors: Elijah Hall, Plano, TX (US); Todd Bocksell, Chicago, IL (US); Eun Pyung Park, Bellevue, WA (US); Peter Willard Shankel, Sachse, TX (US); Matthew Robert Teshera, Weehawken, NJ (US); Christopher A. Sitton, Rockwall, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 71 days.

(21) Appl. No.: 17/088,712

(22) Filed: Nov. 4, 2020

(65) Prior Publication Data

US 2022/0141297 A1 May 5, 2022

(51) Int. Cl.
| | |
|---|---|
| *H04L 67/50* | (2022.01) |
| *G06Q 30/02* | (2012.01) |
| *H04L 9/32* | (2006.01) |
| *G06F 16/908* | (2019.01) |
| *G06F 16/957* | (2019.01) |

(52) U.S. Cl.
CPC .......... *H04L 67/535* (2022.05); *G06F 16/908* (2019.01); *G06F 16/9574* (2019.01); *G06Q 30/0269* (2013.01); *G06Q 30/0277* (2013.01); *H04L 9/3213* (2013.01); *H04L 9/3247* (2013.01)

(58) Field of Classification Search
CPC ..... H04L 67/22; H04L 9/3213; H04L 9/3247; G06F 16/908; G06F 16/9574; G06Q 30/0269; G06Q 30/0277
See application file for complete search history.

(56) References Cited

U.S. PATENT DOCUMENTS

| | | | |
|---|---|---|---|
| 2019/0197582 A1* | 6/2019 | Sivaramakrishnan | .. H04W 4/21 |
| 2022/0020062 A1* | 1/2022 | Freeman | ............ G06Q 30/0241 |
| 2022/0036405 A1* | 2/2022 | Publicover | ....... H04N 21/25883 |

\* cited by examiner

*Primary Examiner* — Joe Chacko
(74) *Attorney, Agent, or Firm* — Guntin & Gust, PLC; Mark Wilinski

(57) ABSTRACT

Aspects of the subject disclosure may include, for example, obtaining a first indication of a user of a communication device browsing a first website associated with a first vendor, obtaining a second indication of the user of the communication device browsing a second website associated with a second vendor that is different from the first vendor, determining, in accordance with the first indication and the second indication, that the first vendor and the second vendor operate in a common marketplace, responsive to the determining, obtaining an advertisement of the first vendor to provide to the communication device, and providing the advertisement to the communication device. Other embodiments are disclosed.

20 Claims, 7 Drawing Sheets

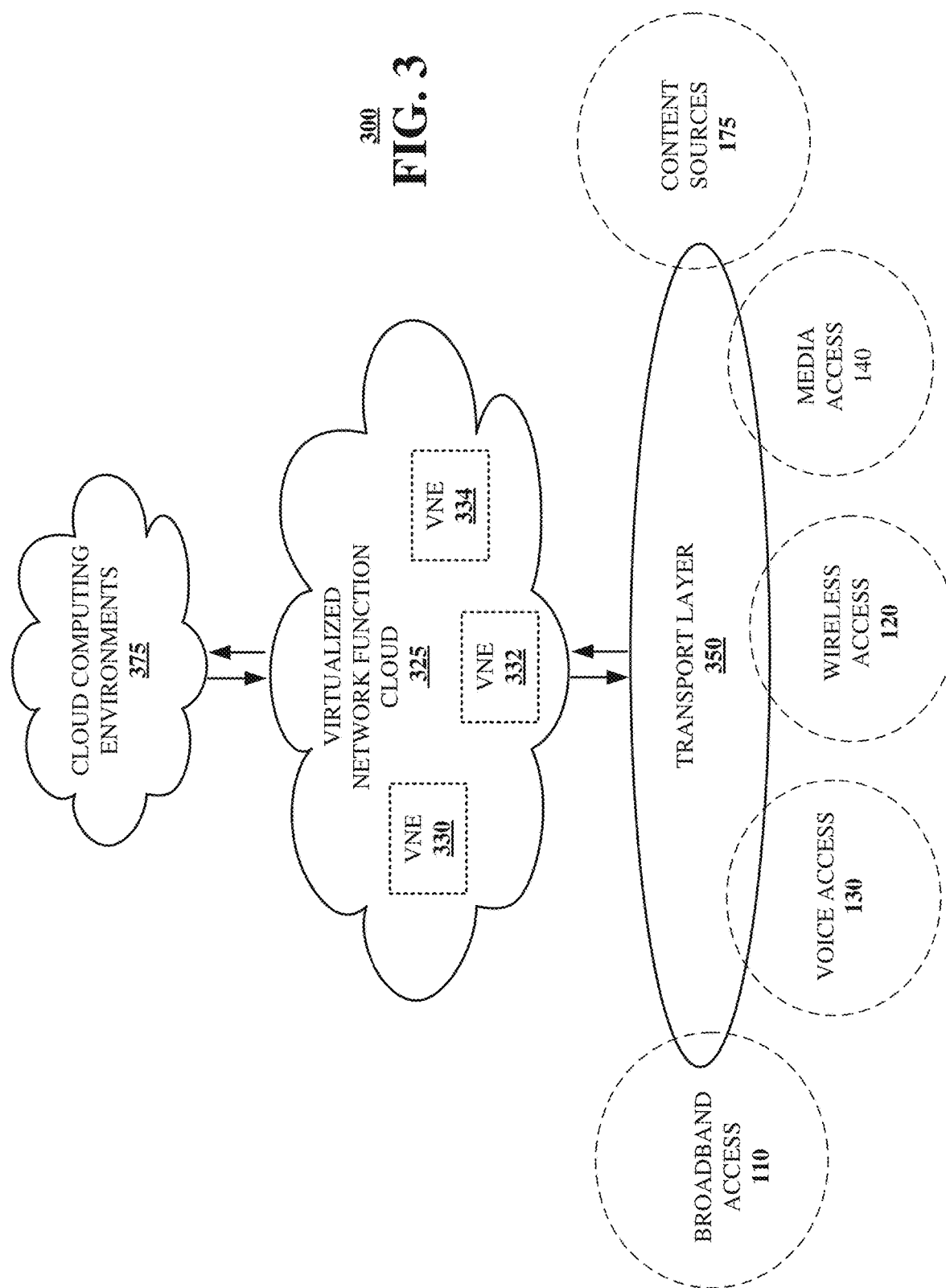

METHODS AND APPARATUSES FOR EXPANDING TARGETS OF CREATIVES BASED ON SIGNATURES

FIELD OF THE DISCLOSURE

The subject disclosure relates to methods and apparatuses for expanding targets of creatives based on signatures.

BACKGROUND

As the world becomes increasingly connected through vast communication networks and via various communication devices, new opportunities are generated to target content to users of such networks and devices. In many instances, a content item may be created by a content creator, and the content item may be distributed to a user by a content distributor, such as a network operator or a service provider. The content item may include inventory that may be populated with other content items, such as advertisements. For example, a sponsor of an advertisement may compensate the creator and/or the distributor of the content item to include the advertisement as part of the inventory. The inclusion of the advertisement as part of the inventory may help to defray/reduce the costs associated with creating and distributing the content item.

Recognizing that resources (e.g., budgets) are finite, an advertiser/sponsor may have to be selective in choosing whether to populate inventory with a given advertisement. Generally, the more information that is available regarding users within a pool of users that may be presented with an advertisement may enhance decision-making processes.

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communication network in accordance with various aspects described herein.

DETAILED DESCRIPTION

The subject disclosure describes, among other things, illustrative embodiments for characterizing users and devices for purposes of selecting creatives to provide to the users and devices. Other embodiments are described in the subject disclosure.

One or more aspects of the subject disclosure include, in whole or in part, obtaining a credential from a user equipment, verifying the credential, responsive to the verifying of the credential, identifying a plurality of activities engaged in by the user equipment, wherein the plurality of activities includes browsing to a first website and browsing to a second website, generating or modifying a signature based on the identifying of the plurality of activities, obtaining a request for a content item from the user equipment, identifying inventory that is available in the content item, selecting at least one advertisement to populate the inventory in accordance with the signature, resulting in a selected at least one advertisement, and providing a first portion of the content item and the selected at least one advertisement to the user equipment.

One or more aspects of the subject disclosure include, in whole or in part, identifying a first online activity of a user, identifying a second online activity of the user, identifying a gap between the first online activity and the second online activity in terms of: an occurrence of a third online activity between the first online activity and the second online activity, a passage of time between the first online activity and the second online activity in an amount greater than a threshold, or a combination thereof, based on the identifying of the first online activity, the identifying of the second online activity, and the identifying of the gap, selecting a creative to provide to a communication device associated with the user, and providing the creative to the communication device.

One or more aspects of the subject disclosure include, in whole or in part, obtaining a first indication of a user of a communication device browsing a first website associated with a first vendor, obtaining a second indication of the user of the communication device browsing a second website associated with a second vendor that is different from the first vendor, determining, in accordance with the first indication and the second indication, that the first vendor and the second vendor operate in a common marketplace, responsive to the determining, obtaining an advertisement of the first vendor to provide to the communication device, and providing the advertisement to the communication device.

Figure 1:
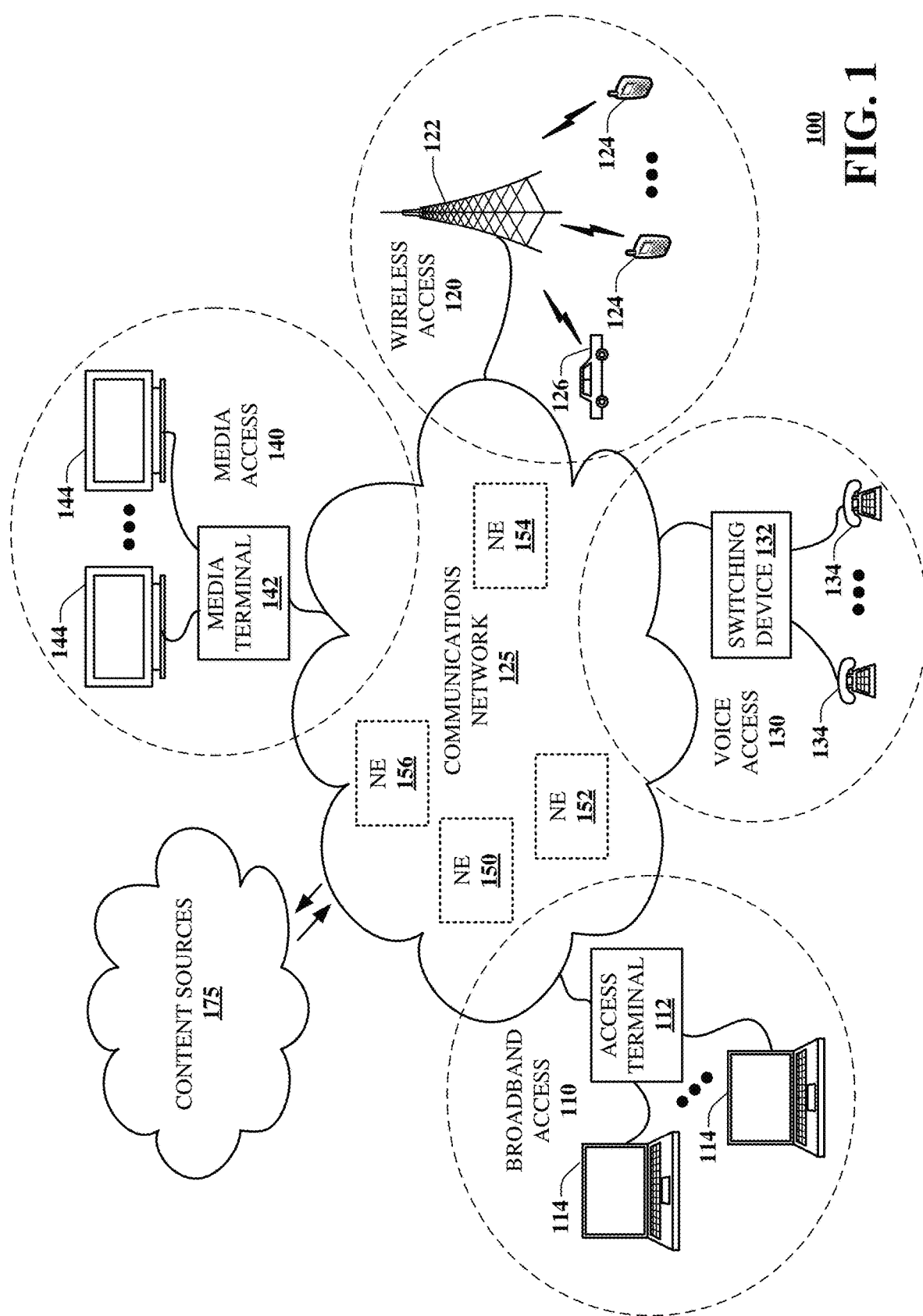
FIG. 1 is a block diagram illustrating an exemplary, non-limiting embodiment of a communications network in accordance with various aspects described herein.

Referring now to FIG. 1, a block diagram is shown illustrating an example, non-limiting embodiment of a system 100 in accordance with various aspects described herein. For example, system 100 can facilitate in whole or in part obtaining a credential from a user equipment, verifying the credential, responsive to the verifying of the credential, identifying a plurality of activities engaged in by the user equipment, wherein the plurality of activities includes browsing to a first website and browsing to a second website, generating or modifying a signature based on the identifying of the plurality of activities, obtaining a request for a content item from the user equipment, identifying inventory that is available in the content item, selecting at least one advertisement to populate the inventory in accordance with the signature, resulting in a selected at least one advertisement, and providing a first portion of the content item and the selected at least one advertisement to the user equipment. System 100 can facilitate in whole or in part identifying a first online activity of a user, identifying a second online activity of the user, identifying a gap between the first online activity and the second online activity in terms of: an occurrence of a third online activity between the first online activity and the second online activity, a passage of time between the first online activity and the second online activity, or a combination thereof, based on the identifying of the first online activity, the identifying of the second online activity, and the identifying of the gap, selecting a creative to provide to a communication device associated with the user, and providing the creative to the communication device. System 100 can facilitate in whole or in part obtaining a first indication of a user of a communication device browsing a first website associated with a first vendor, obtaining a second indication of the user of the communication device browsing a second website associated with a second vendor that is different from the first vendor, determining, in accordance with the first indication and the second indication, that the first vendor and the second vendor operate in a common marketplace, responsive to the determining, obtaining an advertisement of the first vendor to provide to the communication device, and providing the advertisement to the communication device.

In particular, in FIG. 1 a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
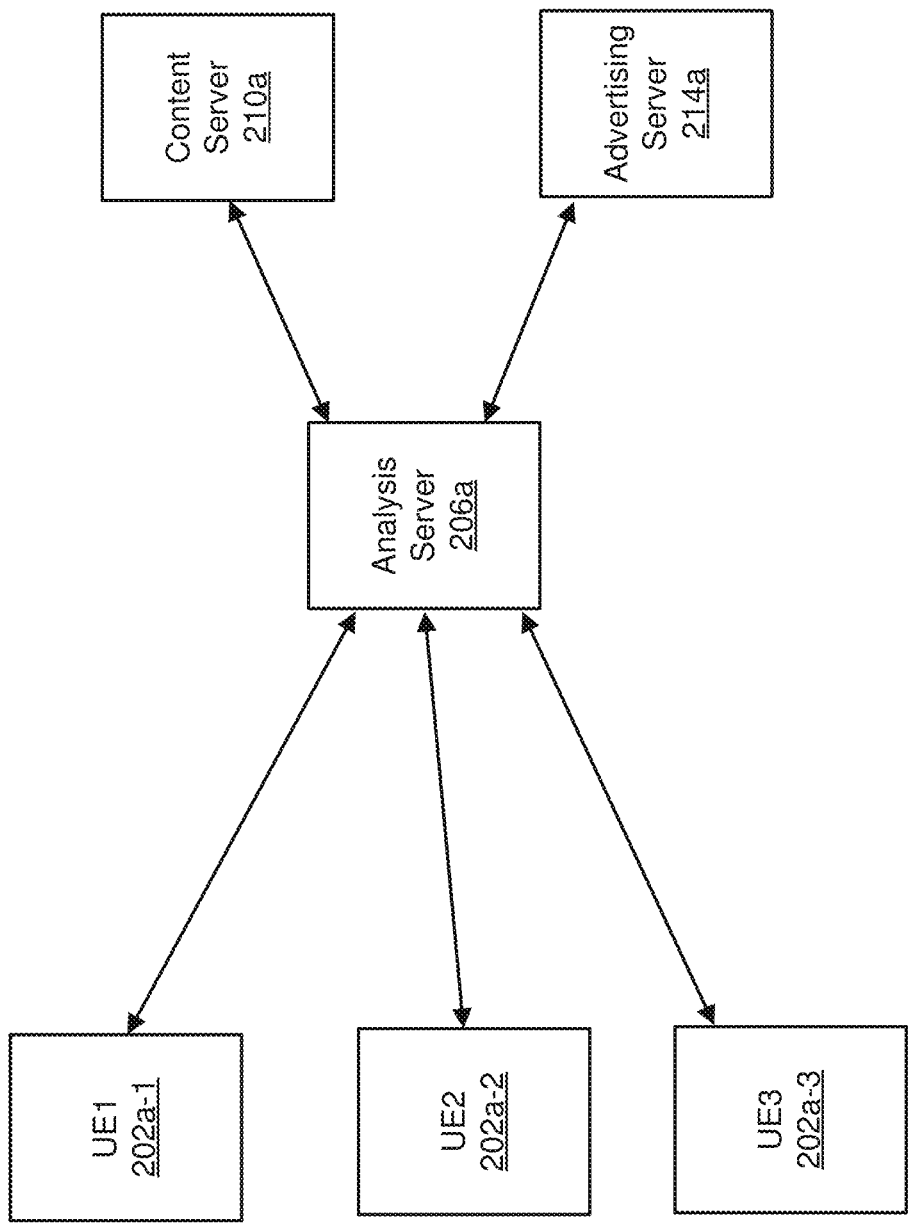
FIG. 2A is a block diagram illustrating an example, non-limiting embodiment of a system functioning within the communication network of FIG. 1 in accordance with various aspects described herein.

FIG. 2A is a block diagram illustrating an example, non-limiting embodiment of a system 200a functioning within, or operatively overlaid upon, the communication network 100 of FIG. 1 in accordance with various aspects described herein. The system 200a may include one or more communication devices. For example, the system 200a is shown in FIG. 2A as including a first user equipment (UE) 202a-1, a second UE 202a-2, a third UE 202a-3, an analysis server 206a, a content server 210a, and an advertising server 214a. The system 200a may conform to a client-server architecture/arrangement. In some embodiments, the system 200a may incorporate aspects of a peer-to-peer network. While the servers 206a through 214a are shown separately in FIG. 2A, in some embodiments two or more of the servers 206a through 214a may be included/incorporated as part of a common structure (e.g., may be included within a common casing or housing).

A given UE may be associated with one or more users. In some embodiments, the first UE 202a-1 may correspond to a first device of a first user (e.g., a laptop of the first user) and the second UE 202a-2 may correspond to a second device of the first user (e.g., a smartphone of the first user). In some embodiments, user log-in credentials, a SIM card, etc., may be used to distinguish users of a given device (e.g., the third UE 202a-3).

The UEs 202a-1 through 202a-3 may be communicatively coupled to the server 206a. A given UE (e.g., the first UE 202a-1) may provide data or information to the server 206a that may correspond, or contribute, to a signature or profile of a user that uses the UE. For example, the data or information may include or pertain to: an identification of content items requested, recorded, and/or presented by the UE, browsing activity/history, purchase decisions (e.g., placing an identified product or service into a virtual shopping cart, completing a transaction for the product or service, etc.), demographic information (e.g., an identification of a user's age, sex, occupation, income level or other compensation, religious affiliation, etc.), social media activities, an identification of contacts of the user, an identification of communication sessions that the user has engaged in, applications executed by or available on the UE, the user's calendar or other schedule, etc., or any combination thereof.

Regarding the use of content items, a given UE (or, analogously, a user of the given UE) may request one or more content items. The request may be facilitated by, e.g., a search query, a selection from: an electronic programming guide (EPG), an interactive programming guide (IPG), and/ or a menu, etc. The analysis server 206a may receive the request and may identify one or more content items that are to be provided to the UE based on the request. For example, the analysis server 206a may obtain the one or more content items from the content server 210a and may provide (e.g., transmit) the one or more content items to the given UE.

In some embodiments, the analysis server 206a may generate one or more recommendations or suggestions regarding a content item in respect of a given UE (or, analogously, a user of the given UE). For example, if a user of the given UE has a history of consuming comedies, the analysis server may suggest/recommend other comedies for the user. In this regard, a given content item as provided by, e.g., the content server 210a may include metadata that may identify a genre of the content item. Other types of characteristics (e.g., identifications of characters, plot lines/sequences, run time/duration, program name/title, episode/ track identifiers, identifications of sponsored content (e.g., advertisement) placement opportunities, etc.) may be included in the metadata.

As described above, a user's (or, analogously, a device's) browsing activities/history may be consulted/analyzed by, e.g., the analysis server 206a, as part of establishing or maintaining a profile or signature for the user. In some embodiments, the browsing activities/history may be determined on the basis of a use and/or a monitoring of cookies (frequently referred to in the art as web cookies, Internet cookies, or browser cookies, as would be appreciated by one skilled in the art). In some embodiments, telecommunications, network, and/or Internet Service Provider (ISP) data/ parameters may be analyzed to identify relationships between online activities and sponsored content (e.g., advertisement) placement opportunities.

In some embodiments, online (e.g., browsing) activities may be analyzed to identify patterns in the online activities. As an illustrative example, a web browser's history/records may indicate that a first user has been browsing websites related to automobiles (over a period of time) in an amount greater than a threshold. Such browsing activities may suggest/indicate that the first user is likely interested in purchasing an automobile (e.g., may suggest/indicate that the first user is likely interested in purchasing an automobile in an amount greater than a threshold). In this respect, the first user may be provided with a first advertisement related to an automobile during a presentation of a first content item. In contrast, a second user that is presented with/consumes the same first content item may be provided with a different, second advertisement. For example, the second advertisement may pertain to, e.g., sporting goods when the second user's online activities indicate that the second user has perused websites associated with sports teams and/or has engaged in social media activities pertaining to sports teams. In this respect, an advertisement that is provided to a particular user may be selected in accordance with the particular user's perceived interests. Stated slightly differently, an advertisement that is provided to a given user may be targeted to that user. The advertisements may be stored by/at the advertising server 214a and may be obtained by the analysis server 206a for provisioning to the user (or, analogously, a UE of the given user).

From the perspective of a provider of sponsored content (e.g., an advertisement), the provider might not only be interested in knowing whether a user has browsed particular genres/categories of websites (e.g., automobile websites), but may be interested in knowing the identity of a sponsor or owner of the websites. Continuing the above example, if the provider of the sponsored content knows that the first user browsed to a first website associated with a direct competitor of the provider, the provider may invest more heavily on advertising directed to the first user than if the first user browsed to a second website associated with an indirect competitor of the provider. In this regard, the user's online activities (as obtained by, e.g., the analysis server 206a) may include an identification of sponsors (or owners) of websites, an identification of products or services advertised on or associated with the websites, etc.

In some embodiments, a trajectory or sequence in online (e.g., browsing) activity may be examined/analyzed to identify a user's potential interest in a product or service. To demonstrate, and continuing the example provided immediately above, if the first user browsed to the first website associated with the direct competitor immediately before or immediately after browsing to a third website associated with the provider, that may be more indicative or suggestive that the user is potentially interested in a product/service of the provider (or a product/service of the competitor) than if there was a break or gap between the browsing to the third website associated with the provider and the browsing to the first website associated with the direct competitor. The gap or break may be consumed by browsing to other websites (such as a fourth website unrelated to automobiles) and/or other online activities (e.g., engaging in a communication session [e.g., a voice call], engaging in social media activities [e.g., sending a text message over a social media platform], etc.), a passage of time in an amount greater than a threshold, etc. The existence of a gap or break, as well as an indication of a size or extent of the gap/break, may be analyzed to identify a user's level of perceived interest (or, analogously, a lack thereof) in a product/service of the provider (or a product/service of the competitor).

As demonstrated by the foregoing, a provider of sponsored content may engage in decision-making processes regarding sponsored content based on information or data associated with a user's online activities. In some of the examples included above, a provider's investment in respect of a given user may be based on an identification of an interest of the user in the provider's products/services/ websites and/or an interest of the user in products/services/ websites of one or more competitors of the provider. Aspects of this disclosure may be used to identify placement opportunities for the provider of the sponsored content in marketplaces that may, at least on their face, bear little resemblance to the products/services of the provider of the sponsored content. For example, if data/information that is available to, e.g., the analysis server 206a and/or the advertising server 214a indicates or suggests that users that browse to websites associated with cleaning supplies also tend to browse to websites associated with automobiles, the provider of the sponsored content may be more inclined to invest in inventory available on the websites of the cleaning supplies than the provider otherwise would in the absence of such data/information.

Figure 2B:
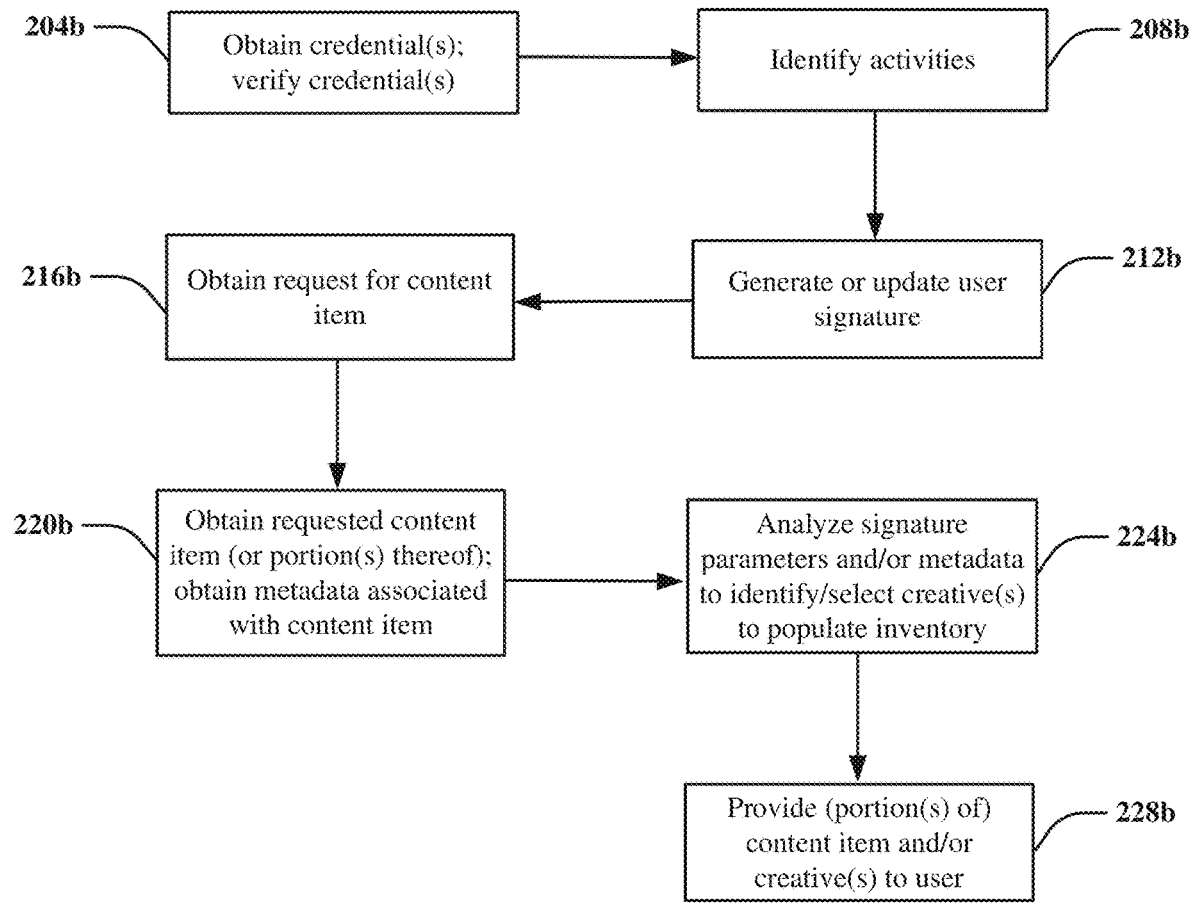
FIG. 2B depicts an illustrative embodiment of a method in accordance with various aspects described herein.

Referring now to FIG. 2B, an illustrative embodiment of a method 200b in accordance with various aspects described herein is shown. The method 200b may be partially or wholly executed by one or more systems, devices, and/or components, such as for example the systems, devices, and components set forth herein. To demonstrate, aspects of the method 200b may be facilitated by the analysis server 206a of FIG. 2A. The method 200b may be executed to select a creative (e.g., an advertisement) for populating inventory associated with one or more content items.

In block 204b, one or more credentials associated with a user (or, analogously, a communication device of the user) may be obtained. In some embodiments, the credential(s) may include a username and a password, a personal identification number (PIN), one or more results of a biometric scan (e.g., a retinal scan, a fingerprint, etc.), use of a two-factor authentication (2FA) technique, etc., or any combination thereof. The credential(s) may be validated/verified as part of block 204b.

In block 208b, activities of the user (identified as part of block 204b) may be identified. For example, as part of block 208b: a location of the user may be tracked (e.g., a change from a first location to a second location may be identified), the user's participation in one or more communication sessions may be logged, a record of the user's online activities (e.g., website browsing/web browser activities, social media activities, etc.) may be generated, etc.

In block 212b, a profile/signature of the user may be generated in the first instance, and/or updated/modified in subsequent instances, based at least in part on the activities identified in block 208b. The profile/signature of block 212b may be supplemented with other information, such as for example demographic information associated with the user, logs/records of purchase decisions made by the user, logs/records of media consumed by the user, etc.

In block 216b, a request for a content item may be obtained from the user. The request may correspond to an affirmative request for the content item, such as for example a selection of a link in response to a search query that is based on the content item (e.g., a search query that includes keywords that fairly map to the content item). In some instances, the request for the content item may be passive in nature, such as for example the user tuning to a channel that is used to convey the content item as part of scheduled programming.

In block 220b, the content item (or one or more portions thereof) requested in block 216b may be obtained. For example, and briefly referring to FIG. 2A, as part of block 220b the analysis server 206a may obtain the (portion(s) of the) content item from the content server 210a. In some embodiments, the (portion(s) of the) content item obtained as part of block 220b may be supplemented with metadata that may identify inventory that is available for consumption (by one or more creatives) within the content item. The metadata may further identify parameters associated with the content item and/or the inventory, such as for example a creator and/or a distributor of the content item, a genre of the content item, a location of the inventory within the content item, a dimension associated with the inventory, a size of the inventory, and/or a duration of the inventory, etc.

In block 224b, the analysis server 206a may analyze the parameters of the signature (of block 212b), potentially in conjunction with the metadata of block 220b, to identify/select a creative that may be appropriate for the user in respect of the inventory. The selection of block 224b may adhere to one or more bidding models/auctions, whereby advertisers/sponsored content providers may provide bids in accordance with the parameters of the profile and the metadata. The analysis server 206a may obtain the selected creative from the advertising server 214a as part of block 224b to populate the inventory.

In block 228b, the (portion(s) of the) content item obtained as part of block 220b and/or the selected creative of block 224b may be provided (e.g., transmitted) to the user (or, analogously, the communication device of the user). The content item and/or the creative may be provided in accordance with one or more distribution models, such as for example a streaming distribution model, a linear distribution model, an on-demand distribution model, etc. As part of block 228b, the user's communication device may record and/or present (e.g., playback) the content item and/or the creative.

While for purposes of simplicity of explanation, the respective processes are shown and described as a series of blocks in FIG. 2B, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Aspects of this disclosure may respect a user's right to privacy without any sacrifice in terms of a selection or provisioning of creatives to the user. For example, parameters of a user's profile/signature may be anonymized by utilizing a profile/signature name that maps to the user's login name (or other credential). In this respect, the anonymized profile/signature may be shared amongst users or devices without any concern for compromising the user's security or privacy. Creative providers and/or creative distributors may utilize the anonymized profile/signature as part of decision-making processes to determine whether the user is one that the creative provider or creative distributor would like to target (and if so, to what extent the creative provider or creative distributor would like to target the user). In this regard, the anonymized profile/signature may be provided to creative creators and/or creative distributors to solicit bids as part of an auction. A selection of a creative to populate inventory may be based on bids that are obtained (e.g., received) in response to that solicitation.

Various ad insertion management techniques and/or devices can be utilized in conjunction with the embodiments described herein (e.g., line items, deals, auctions, business rule enforcement, yield policy enforcement, competitive separation enforcement, and others) such as described in U.S. patent application Ser. No. 16/560,666 filed Sep. 4, 2019 and entitled "Content Management in Over-The-Top Services", and also described in U.S. application Ser. No. 16/870,098 filed May 8, 2020 and entitled "Method and Apparatus for Managing Deals of Brokers in Electronic Advertising", the disclosures of which are hereby incorporated by reference herein in their entirety.

In some embodiments, indicators of user activities may be provided to one or more vendors responsive to a determination that the activities and the vendors map to/define/operate in a common marketplace. Proof/documentation of the activities may encourage a vendor to populate inventory in a content item that is consumed by a user. In some embodiments, a vendor may be charged/assessed a fee for a creative (e.g., an advertisement) of the vendor being provided to a user (or a communication device associated with the user).

As described above, a user's activities (inclusive of the user's online activities) may be examined/analyzed to identify the user's potential interest (or, analogously, lack of interest) in a product or a service of a given kind/type. Decisions may be made regarding creatives (e.g., advertisements) to provide to the user on the basis of the perceived interest in the creatives (or products/services referenced within the creatives). In this manner, scarce resources (e.g., budgets) may be allocated more efficiently relative to conventional technologies.

Aspects of this disclosure may adapt to changes in user behavior, opinions, or feelings over time. This may be contrasted with conventional technology, characterized by static views or perspectives regarding a user. In some embodiments, one or more filtration techniques may be used to reduce (e.g., minimize) the impact of spurious inputs or results.

In some embodiments, a user's activities may be transformed from words or other descriptors of the activities into a weighted distribution of topics, where each topic may represent a collection of terms or parameters that tend to occur frequently together (e.g., occur with a frequency in an amount greater than a threshold). In some embodiments, the activities and/or the topics may adhere to a vector representation along one or more dimensions, and the similarity (or, analogously, the difference) between any two vectors, or various combinations of vectors, may be compared using one or more techniques (e.g., cosine similarity, Euclidean distance similarity, L1 similarity, Canberra similarity, position similarity (overlap), a ratio of overlap relative to vector length, Jaccard similarity, etc.). In some embodiments, one or more mathematical or statistical processes may be applied to the vectors to identify relationships that may be generalized/extended for purposes of generating predictions in respect of future uses. In some embodiments, one or more machine learning (ML) and/or artificial intelligence (AI) based applications may be executed/utilized to enhance an accuracy in terms of prediction or analysis. Any errors in prediction or analysis may be provided as feedback in conjunction with one or more algorithms or models in order to have the error converge towards zero. Stated slightly differently, the algorithms/models may tend to become more accurate over time as they are executed/used.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of system 100, the subsystems and functions of system 200a, and method 200b presented in FIGS. 1, 2A, and 2B. For example, virtualized communication network 300 can facilitate in whole or in part obtaining a credential from a user equipment, verifying the credential, responsive to the verifying of the credential, identifying a plurality of activities engaged in by the user equipment, wherein the plurality of activities includes browsing to a first website and browsing to a second website, generating or modifying a signature based on the identifying of the plurality of activities, obtaining a request for a content item from the user equipment, identifying inventory that is available in the content item, selecting at least one advertisement to populate the inventory in accordance with the signature, resulting in a selected at least one advertisement, and providing a first portion of the content item and the selected at least one advertisement to the user equipment. Virtualized communication network 300 can facilitate in whole or in part identifying a first online activity of a user, identifying a second online activity of the user, identifying a gap between the first online activity and the second online activity in terms of: an occurrence of a third online activity between the first online activity and the second online activity, a passage of time between the first online activity and the second online activity, or a combination thereof, based on the identifying of the first online activity, the identifying of the second online activity, and the identifying of the gap, selecting a creative to provide to a communication device associated with the user, and providing the creative to the communication device. Virtualized communication network 300 can facilitate in whole or in part obtaining a first indication of a user of a communication device browsing a first website associated with a first vendor, obtaining a second indication of the user of the communication device browsing a second website associated with a second vendor that is different from the first vendor, determining, in accordance with the first indication and the second indication, that the first vendor and the second vendor operate in a common marketplace, responsive to the determining, obtaining an advertisement of the first vendor to provide to the communication device, and providing the advertisement to the communication device.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
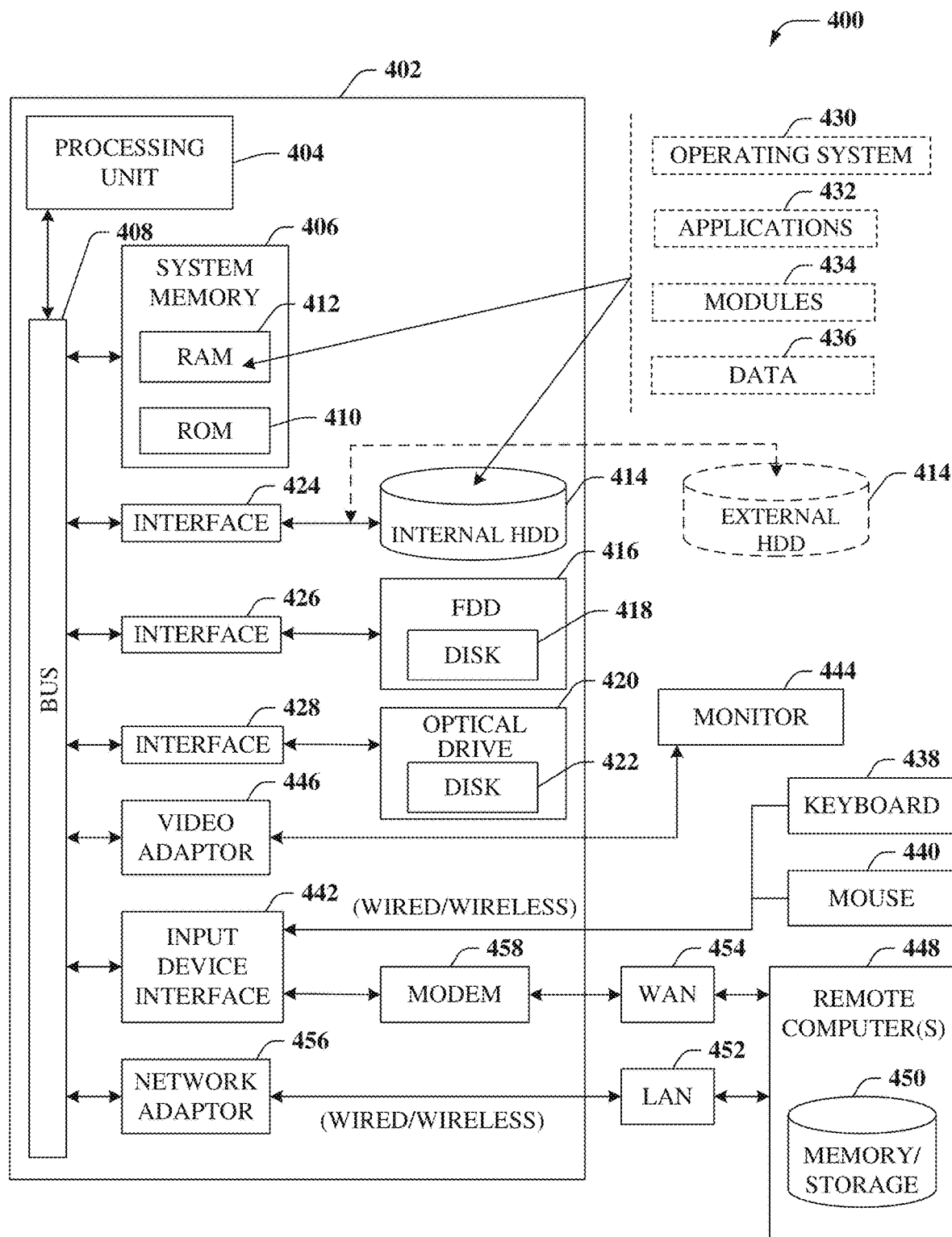
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part obtaining a credential from a user equipment, verifying the credential, responsive to the verifying of the credential, identifying a plurality of activities engaged in by the user equipment, wherein the plurality of activities includes browsing to a first website and browsing to a second website, generating or modifying a signature based on the identifying of the plurality of activities, obtaining a request for a content item from the user equipment, identifying inventory that is available in the content item, selecting at least one advertisement to populate the inventory in accordance with the signature, resulting in a selected at least one advertisement, and providing a first portion of the content item and the selected at least one advertisement to the user equipment. Computing environment 400 can facilitate in whole or in part identifying a first online activity of a user, identifying a second online activity of the user, identifying a gap between the first online activity and the second online activity in terms of: an occurrence of a third online activity between the first online activity and the second online activity, a passage of time between the first online activity and the second online activity, or a combination thereof, based on the identifying of the first online activity, the identifying of the second online activity, and the identifying of the gap, selecting a creative to provide to a communication device associated with the user, and providing the creative to the communication device. Computing environment 400 can facilitate in whole or in part obtaining a first indication of a user of a communication device browsing a first website associated with a first vendor, obtaining a second indication of the user of the communication device browsing a second website associated with a second vendor that is different from the first vendor, determining, in accordance with the first indication and the second indication, that the first vendor and the second vendor operate in a common marketplace, responsive to the determining, obtaining an advertisement of the first vendor to provide to the communication device, and providing the advertisement to the communication device.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
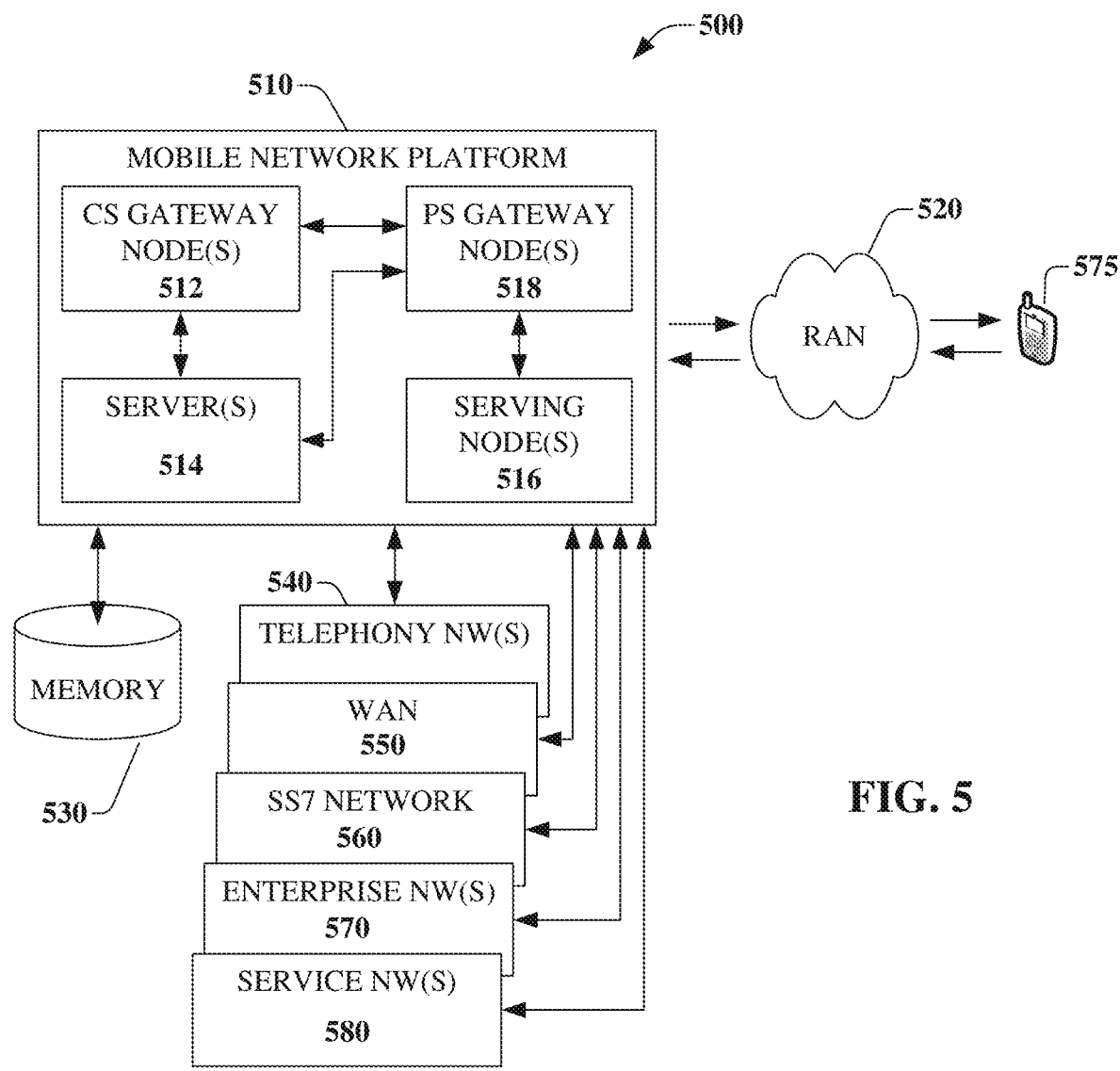
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part obtaining a credential from a user equipment, verifying the credential, responsive to the verifying of the credential, identifying a plurality of activities engaged in by the user equipment, wherein the plurality of activities includes browsing to a first website and browsing to a second website, generating or modifying a signature based on the identifying of the plurality of activities, obtaining a request for a content item from the user equipment, identifying inventory that is available in the content item, selecting at least one advertisement to populate the inventory in accordance with the signature, resulting in a selected at least one advertisement, and providing a first portion of the content item and the selected at least one advertisement to the user equipment. Platform 510 can facilitate in whole or in part identifying a first online activity of a user, identifying a second online activity of the user, identifying a gap between the first online activity and the second online activity in terms of: an occurrence of a third online activity between the first online activity and the second online activity, a passage of time between the first online activity and the second online activity, or a combination thereof, based on the identifying of the first online activity, the identifying of the second online activity, and the identifying of the gap, selecting a creative to provide to a communication device associated with the user, and providing the creative to the communication device. Platform 510 can facilitate in whole or in part obtaining a first indication of a user of a communication device browsing a first website associated with a first vendor, obtaining a second indication of the user of the communication device browsing a second website associated with a second vendor that is different from the first vendor, determining, in accordance with the first indication and the second indication, that the first vendor and the second vendor operate in a common marketplace, responsive to the determining, obtaining an advertisement of the first vendor to provide to the communication device, and providing the advertisement to the communication device.

In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
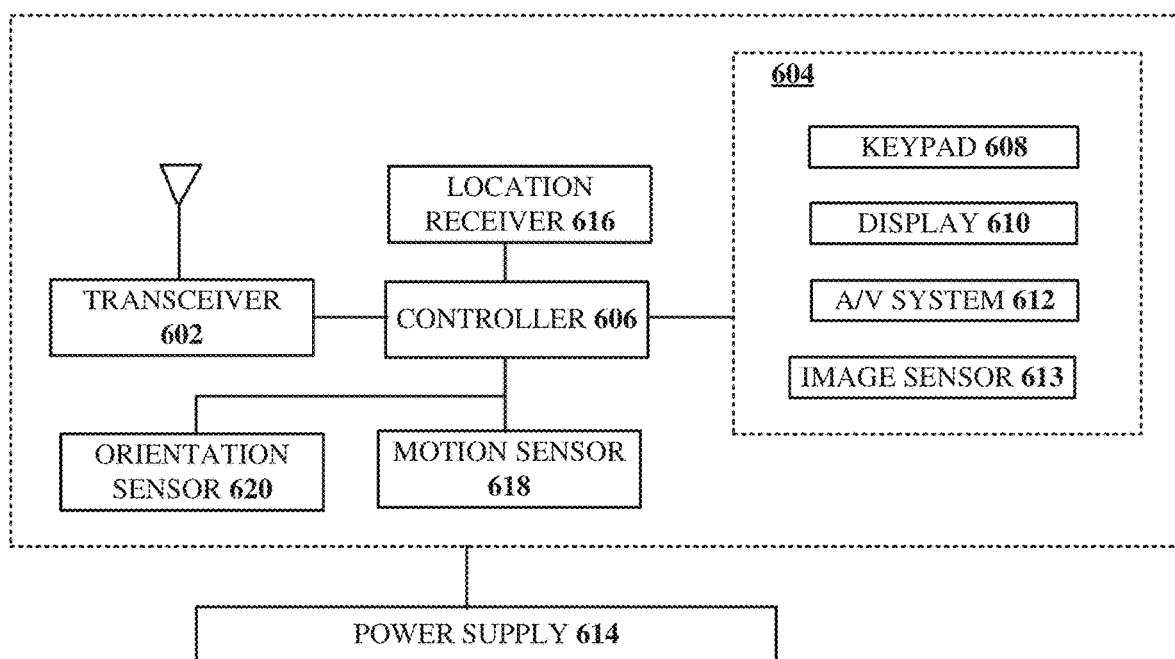
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part obtaining a credential from a user equipment, verifying the credential, responsive to the verifying of the credential, identifying a plurality of activities engaged in by the user equipment, wherein the plurality of activities includes browsing to a first website and browsing to a second website, generating or modifying a signature based on the identifying of the plurality of activities, obtaining a request for a content item from the user equipment, identifying inventory that is available in the content item, selecting at least one advertisement to populate the inventory in accordance with the signature, resulting in a selected at least one advertisement, and providing a first portion of the content item and the selected at least one advertisement to the user equipment. Computing device 600 can facilitate in whole or in part identifying a first online activity of a user, identifying a second online activity of the user, identifying a gap between the first online activity and the second online activity in terms of: an occurrence of a third online activity between the first online activity and the second online activity, a passage of time between the first online activity and the second online activity, or a combination thereof, based on the identifying of the first online activity, the identifying of the second online activity, and the identifying of the gap, selecting a creative to provide to a communication device associated with the user, and providing the creative to the communication device. Computing device 600 can facilitate in whole or in part obtaining a first indication of a user of a communication device browsing a first website associated with a first vendor, obtaining a second indication of the user of the communication device browsing a second website associated with a second vendor that is different from the first vendor, determining, in accordance with the first indication and the second indication, that the first vendor and the second vendor operate in a common marketplace, responsive to the determining, obtaining an advertisement of the first vendor to provide to the communication device, and providing the advertisement to the communication device.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, x=(x1, x2, x3, x4, . . . , xn), to a confidence that the input belongs to a class, that is, f(x) =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/ communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
a processing system including a processor; and
a memory that stores executable instructions that, when executed by the processing system, facilitate performance of operations, the operations comprising:
obtaining a credential from a user equipment;
verifying the credential;
responsive to the verifying of the credential, identifying a plurality of activities engaged in by the user equipment, wherein the plurality of activities includes browsing to a first website and browsing to a second website;
generating or modifying a signature based on the identifying of the plurality of activities;
obtaining a request for a content item from the user equipment;
identifying inventory that is available in the content item;
anonymizing the signature, resulting in an anonymized signature;
providing the anonymized signature to a first advertiser and a second advertiser;
obtaining a first bid from the first advertiser and a second bid from the second advertiser responsive to the providing of the anonymized signature;
selecting at least one advertisement to populate the inventory based on the first bid and the second bid, resulting in a selected at least one advertisement; and
providing a first portion of the content item and the selected at least one advertisement to the user equipment.

2. The device of claim 1, wherein the credential identifies: the user equipment, a user of the user equipment, or a combination thereof.

3. The device of claim 1, wherein the identifying of the plurality of activities includes identifying a sequence of the browsing to the first website and the browsing to the second website, and wherein the generating or modifying of the signature is based on the identifying of the sequence.

4. The device of claim 3, wherein when the sequence includes a gap between the browsing to the first website and the browsing to the second website the selected at least one advertisement corresponds to a first advertisement, and wherein when the sequence does not include the gap between the browsing to the first website and the browsing to the second website the selected at least one advertisement corresponds to a second advertisement that is different from the first advertisement.

5. The device of claim 1, wherein the identifying of the plurality of activities includes identifying a social media activity of a user of the user equipment, and wherein the generating or modifying of the signature is based on the identifying of the social media activity.

6. The device of claim 1, wherein the identifying of the plurality of activities includes identifying a communication session engaged in by the user equipment, and wherein the generating or modifying of the signature is based on the identifying of the communication session.

7. The device of claim 1, wherein the identifying of the plurality of activities includes identifying a purchase activity engaged in by the user equipment, and wherein the generating or modifying of the signature is based on the identifying of the purchase activity.

8. The device of claim 7, wherein the identifying of the purchase activity includes: identifying a product or a service placed into a virtual shopping cart, a completion of a transaction for the product or the service, or any combination thereof.

9. The device of claim 1, wherein the identifying of the plurality of activities is based on a monitoring of cookies.

10. The device of claim 1, wherein the identifying of the plurality of activities includes identifying a change in a location of the user equipment from a first location to a second location, and wherein the generating or modifying of the signature is based on the identifying of the change in location.

11. The device of claim 1, wherein the operations further comprise:
responsive to the obtaining of the request for the content item, obtaining metadata associated with the content item,
wherein the selecting of the at least one advertisement is further based on an analysis of the metadata.

12. The device of claim 11, wherein the identifying of the inventory that is available in the content item is based on the analysis of the metadata.

13. The device of claim 11, wherein the metadata identifies a creator of the content item, a distributor of the content item, a genre of the content item, a location of the inventory within the content item, a dimension associated with the inventory, a size of the inventory, and a duration of the inventory.

14. The device of claim 1, wherein the providing of the first portion of the content item and the selected at least one advertisement to the user equipment adheres to a streaming distribution model.

15. The device of claim 1, wherein the selected at least one advertisement includes a plurality of advertisements.

16. A non-transitory machine-readable medium, comprising executable instructions that, when executed by a processing system including a processor, facilitate performance of operations, the operations comprising:
identifying a first online activity of a user;
identifying a second online activity of the user;
identifying a gap between the first online activity and the second online activity in terms of: an occurrence of a third online activity between the first online activity and the second online activity, a passage of time between the first online activity and the second online activity in an amount greater than a threshold, or a combination thereof;
based on the identifying of the first online activity, the identifying of the second online activity, and the identifying of the gap, selecting a creative to provide to a communication device associated with the user; and
providing the creative to the communication device.

17. The non-transitory machine-readable medium of claim 16, wherein the first online activity and the second online activity are facilitated by the communication device, and wherein the creative includes an advertisement.

18. A method, comprising:
obtaining, by a processing system including a processor, a first indication of a user of a communication device browsing a first website associated with a first vendor;

obtaining, by the processing system, a second indication of the user of the communication device browsing a second website associated with a second vendor that is different from the first vendor;

determining, by the processing system and in accordance with the first indication and the second indication, that the first vendor and the second vendor operate in a common marketplace;

generating, by the processing system, a signature for the user based on the first indication and the second indication;

anonymizing, by the processing system, the signature, resulting in an anonymized signature;

providing, by the processing system and based on the determining, the anonymized signature to the first vendor and the second vendor;

obtaining, by the processing system, a first bid from the first vendor and a second bid from the second vendor responsive to the providing of the anonymized signature;

based on the first bid and the second bid, obtaining, by the processing system, an advertisement of the first vendor to provide to the communication device; and providing, by the processing system, the advertisement to the communication device.

19. The method of claim 18, further comprising:

responsive to the determining, providing, by the processing system, the first indication and the second indication to the first vendor;

receiving, by the processing system and from the first vendor, the advertisement from the first vendor based on the providing of the first indication and the second indication to the first vendor; and charging, by the processing system, the first vendor a fee based on the providing the advertisement to the communication device.

20. The method of claim 18, further comprising:

providing, by the processing system, an indication of an extent of a gap between the browsing of the first website and the browsing of the second website to the first vendor, wherein the first bid is based on the indication of the extent of the gap.

* * * * *